United States Patent

Bettger et al.

(10) Patent No.: US 8,838,956 B2
(45) Date of Patent: Sep. 16, 2014

(54) SYSTEM AND METHOD FOR COLLABORATION OVER SHARED STORAGE

(71) Applicant: The Boeing Company, Chicago, IL (US)

(72) Inventors: David D. Bettger, Redondo Beach, CA (US); Kevin A. Stone, Hermosa Beach, CA (US); Dennis L. Kuehn, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/858,825

(22) Filed: Apr. 8, 2013

(65) Prior Publication Data

US 2013/0227024 A1   Aug. 29, 2013

Related U.S. Application Data

(63) Continuation of application No. 12/572,404, filed on Oct. 2, 2009, now Pat. No. 8,417,935.

(60) Provisional application No. 61/104,625, filed on Oct. 10, 2008.

(51) Int. Cl.
*H04L 29/06* (2006.01)
*H04L 12/18* (2006.01)
*G06F 15/173* (2006.01)

(52) U.S. Cl.
CPC ........ *G06F 15/17331* (2013.01); *H04L 63/065* (2013.01); *H04L 63/10* (2013.01); *H04L 63/104* (2013.01); *H04L 63/0428* (2013.01); *H04L 12/1831* (2013.01)
USPC ......................................................... 713/150

(58) Field of Classification Search
CPC ................................. G06F 21/00; G06F 21/60
USPC .......................................................... 713/150
See application file for complete search history.

(56) References Cited

U.S. PATENT DOCUMENTS

| 5,008,853 | A  | * | 4/1991  | Bly et al. ...................... 715/751 |
| 6,366,948 | B1 | * | 4/2002  | Teibel .......................... 709/204 |
| 7,277,549 | B2 |   | 10/2007 | Olkin et al. |
| 7,831,674 | B2 | * | 11/2010 | Wang et al. ................... 709/206 |
| 7,945,622 | B1 | * | 5/2011  | Pegg ............................. 709/204 |
| 8,060,927 | B2 |   | 11/2011 | Engdahl et al. |
| 2004/0025008 | A1 |  | 2/2004 | Kuehn et al. |
| 2007/0155386 | A1 | * | 7/2007 | Wahl et al. .................... 455/436 |
| 2009/0031132 | A1 |   | 1/2009 | Lehwany |
| 2010/0011007 | A1 |   | 1/2010 | Bettger et al. |

* cited by examiner

*Primary Examiner* — Dant Shaifer Harriman
(74) *Attorney, Agent, or Firm* — Haynes and Boone, LLP (57) ABSTRACT

In accordance with one or more embodiments of the present disclosure, systems and methods disclosed herein enable synergy among a group of users by providing a real-time, secure collaboration environment that allows for cooperative interaction and decision making and provide the ability for users to simultaneously view, revise, and review a document or multimedia file that resides in a shared data storage location. Real-time, low latency, rich collaboration between producers and consumers provides organization efficiency, and this collaboration provides real-time, low latency transmission of data.

20 Claims, 7 Drawing Sheets

SYSTEM AND METHOD FOR COLLABORATION OVER SHARED STORAGE

CROSS-REFERENCE TO RELATED APPLICATIONS

This application is a continuation of U.S. patent application Ser. No. 12/572,404, filed Oct. 2, 2009 (U.S. Pat. No. 8,417,935, issued Apr. 9, 2013), which claims the benefit of U.S. Provisional Patent Application No. 61/104,625, filed Oct. 10, 2008, both of which are incorporated herein by reference in their entirety.

TECHNICAL FIELD

The present invention relates generally to network systems and, more particularly, to a system and method for collaboration over shared storage networks.

BACKGROUND

Existing collaboration products are designed to transmit all user messages across one or more networks. Data is never recorded for later playback and inspection or to support security concerns of logging both user actions and transmitted data. Existing solutions generally require expensive, dedicated network links. Existing networks must provide collaboration or data services, but not simultaneously, and are limited in their scalability. Existing collaboration services do not provide security levels for protecting sensitivity of the data. Generally, external physical restrictions are typically required to isolate the information in the collaboration session using dedicated networks and facilities.

Existing security solutions have limited bandwidth and high latency limitations that prohibit real-time, rich collaboration that accommodate extremely large, data-intensive multimedia formats such as images and video. Real-time collaboration requires that information be exchanged at transmission rates that are imperceptible to humans and keeps pace with the speed of natural human dialog and system access rates or even faster to meet critical timelines.

Existing solutions often rely on personal warranty of participants not to leak sensitive information and require inspecting the entire data stream through a high assurance data guard over an Internet Protocol (IP) network. These guards act as intermediaries between users in a collaboration session. These products receive a communication from the first user, inspect the contents of the message, and then either re-transmit the data to the intended receiver or block the transmission.

A traditional data guard or security firewall requires all data to flow through the network in order to perform "deep packet inspection" to review the contents for any sensitive data. This process is expensive both in bandwidth and latency. The bandwidth is limited by the number of packets that the guard may process. The latency is limited by the speed at which the guard may inspect and process the data packet.

If a user is not able to receive a collaboration communication in real-time, there is no mechanism in existing solutions to retrieve the data without the use of a separate process to record and distribute the information. Current systems employ limited logging of data that has been accessed or transported, and security reviews consist or file names and/or User ID only, without access to the full content of the transmitted data.

Collaboration may require real-time exchange of information between multiple parties. In a networked computer environment, this requires low-latency transmission of data. More effective collaboration frequently requires more information, which may increase the size of the data to be exchanged, which leads to greater bandwidth requirements for the collaboration system.

As a result, there is presently a need for a more secure real-time collaboration system.

SUMMARY

In accordance with one or more embodiments of the present disclosure, systems and methods disclosed herein enable synergy among a group of users by providing a real-time, secure collaboration environment that allows for cooperative interaction and decision making and provide the ability for users to simultaneously view, revise and review a document or multimedia file that resides in a single, shared data storage location. Real-time, low latency, rich collaboration between producers and consumers provides efficiency of an organization at reduced cost, both in computing resources, such as hardware, power and cooling, and in reduced risk of inadvertent disclosure. This method provides real-time, low latency transmission of data. For security considerations, data is first screened to maintain protection of sensitive information.

In various implementations, embodiments of the present disclosure provides a method to exchange data at the real-time, high bandwidth speeds necessary for collaboration, without sacrificing reliable security measures to verify access control. A storage area network (SAN) is a dedicated storage network connecting remote storage clusters to server systems and multi-level security (MLS) is a system comprising data at multiple security levels and includes access control restrictions based on a user's credentials.

In one implementation, a method for collaboration using a shared storage system for exchanging information is provided. Users in the collaboration session exchange information by writing to and reading from a shared storage system location. A user in the collaboration session may be a person, software program, computer device, or avatar.

To protect access to sensitive information exchanged in the collaboration session, access to this shared storage location may be restricted to only authorized users. A security system controls access to the storage location. When users enter the collaboration session, they request the storage location from this security system. After the security system has verified the user's credentials, it may grant access to the collaboration session by providing the location in the storage system.

The collaboration session may be protected by encrypting the information before writing it to the shared storage location. Despite access to the shared storage system, other users may not be able to read the information without the decryption key. The contributor of the information may then control to whom they distribute the decryption key. The security system may also verify that a user is authorized to receive the decryption key, and thus read the information, based on the user's credentials and the sensitivity of the information.

With the encryption system employed, a user may use multiple encryption keys and choose which key to encrypt a specific piece of information based on the sensitivity of that piece of information to further restrict which participants in a collaboration session may receive that information depending on to which users the contributor disseminated the chosen key. For example, a user could use two different encryption keys, one for the general audience, and another for more trusted recipients. The user would then switch to the second key for more sensitive information. The general audience would receive the information until the key change such that they could no longer decrypt the information read from the shared storage location.

In various aspects, because information is exchanged through a storage system, the information exchanged may be persisted. This provides a historical record of information exchanged and the users that contributed it. For example, this historical record may be used as a log for auditing the security of the system. Another example involves resolving contention over what user contributed what information providing non-repudiation.

The persisted information from the collaboration sessions may than be retrieved for later playback or broadcast. For example, an authorized user may delay retrieval of collaboration messages from designated storage location until after the session has begun, employ playback features such as fast-forward to scan the messages, join the real-time collaboration session that is in progress and write additional collaboration messages to designated storage location. The persisted information may also be indexed for optimized searching and retrieval.

In one embodiment, a method for real-time collaboration among a group of users over one or more networks over a shared storage system comprises initiating a collaboration session, writing at least one collaboration message, playing back collaboration data, and persisting collaboration data. In various implementations, the method may comprise setting up encryption for the collaboration session, changing an encryption key for the collaboration session, setting a security classification for the collaboration session, and changing a security level for the collaboration session.

In various implementations, the location in the shared storage system is only visible to participants in a collaboration session. The information in the collaboration session is protected by encryption. Participation in the collaboration session is restricted by controlling access to at least one of an encryption key and a decryption key. Multiple encryption and/or decryption keys are used to encrypt and/or decrypt information in the collaboration session, wherein access to the keys may vary by participant, and access to the keys restricts the information each participant may see or contribute. A security classification is associated with each message in a collaboration session. Participation in the collaboration session is restricted by controlling access based on the security classification of the message and the credentials of a participant. The information from the collaboration session is recorded and stored for at least one of retrieval, playback, and broadcast. Playback of a recorded collaboration session is time-shifted. Each participant's identity is associated with information related to each message. Association of a participant's identity with their correspondence provides non-repudiation. A historical record is retained of each interaction in a collaboration session. The historical record ensures "What You See Is What You Sign" protection for participants.

The scope of the present invention is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like devices illustrated in one or more of the figures.

DETAILED DESCRIPTION

In accordance with one or more embodiments of the present disclosure, systems and methods disclosed herein provide for collaboration over shared storage networks.

One or more embodiments of the present disclosure may enable synergy among a group of users by providing a real-time, secure collaboration environment that allows cooperative interaction and decision making. In various implementations, users are provided with the ability to simultaneously view, revise, and review a document and/or a multimedia file that resides in, for example, a single shared data storage location. One or more embodiments of the present disclosure may protect information written to and read from a shared data storage location through encryption of the data.

One or more embodiments of the present disclosure may restrict access to the decryption key to only users in a collaboration session. In one aspect, other users without the decryption key may not be able to participate, despite access to the shared data storage location. In various implementations, writing to and reading from a shared data storage location facilitates high performance data transmission in both bandwidth and lower latency to support real-time interaction in a collaboration session. Leveraging a shared data storage location for collaboration provides a mechanism to exchange information across a network. The shared data storage location provides persistence of information exchanged in the collaboration session. In one aspect, this provides automatic archiving of the collaboration sessions for historical record, replay, and time-shifting.

One or more embodiments of the present disclosure may provide tagging messages in a collaboration session with a security level, which may be used to restrict information that is shared with specific users. One or more embodiments of the present disclosure may enable automatic logging of transported data and provide access for security review. One or more embodiments of the present disclosure may enable real-time, secure collaboration, wherein data exchanged during collaboration may be protected, logged and made available for use.

One or more embodiments of the present disclosure may provide a high assurance data guard that is adapted to verify that users in the collaboration session have the necessary credentials to access the information. One or more embodiments of the present disclosure may provide performance (e.g., in both bandwidth and latency) of a dedicated collaboration system and the security mechanisms of a high assurance guard to protect sensitive information from inadvertent disclosure. One or more embodiments of the present disclosure may reduce the cost of duplicating dedicated systems for each classification of information.

Figure 1:
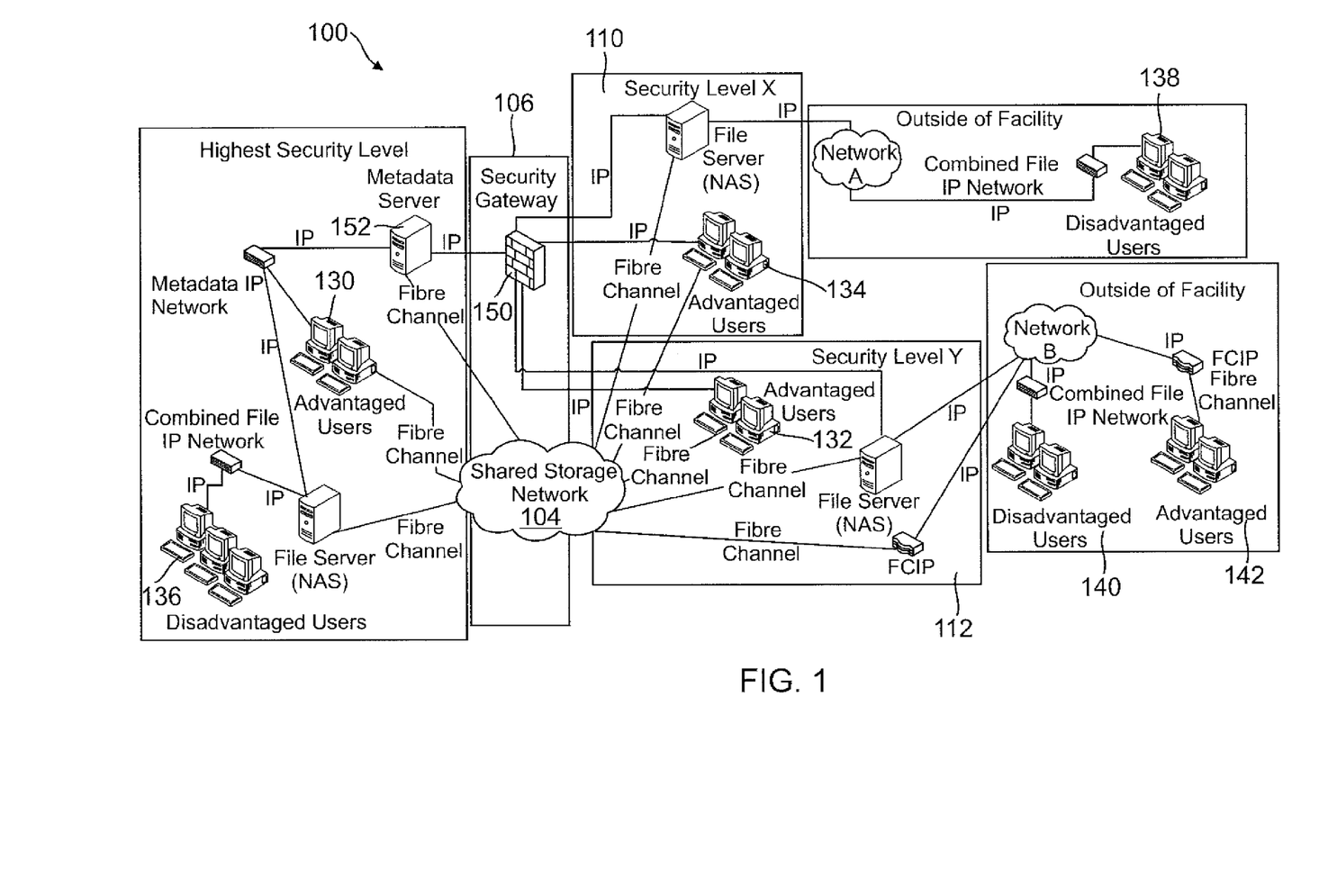
FIG. 1 shows a block diagram of a collaboration system over a shared storage network, in accordance with an embodiment of the present disclosure.

FIG. 1 shows one embodiment of a collaboration system 100 comprising a multi-level security (MLS) system adapted to communicate with at least a first security network 110 and a second security network 114 via a shared storage network (SSN) 104 and/or a security gateway 106. In various implementations, as shown by example in FIG. 1, the first security network 110 may be referred to as security level X, and the second security network 114 may be referred to as security level Y.

Referring to FIG. 1, the collaboration system 100 comprises the SSN 104 for sharing of data, a separate database for storing metadata records, and a high-assurance data guard to control access to the metadata database. In one implementation, the file size is controlled by a directory structure, wherein each type of data transport may be optimized (i.e., small file, low-latency transport for near real time collaboration that may be on RAM memory or on a RAM storage device). Data that is written to a single, shared storage space is disassembled and/or encrypted, rendering it unreadable as a stand-alone file. A separate record (metadata) with instructions on how to reassemble the data is created. One or more users (e.g., users 130, 132, 134, 136, 138, 140, 142) intending to read the data needs this metadata record to re-assemble the original data. This metadata record is stored in a separate database. As shown in FIG. 1, it should be appreciated that users in communication with the collaboration system 100 may be referred to as advantaged users (e.g., users 130, 132, 134, 142) or disadvantaged users (e.g., users 136, 138, 140).

In one implementation, a high assurance guard inspects requests for a metadata record to enforce access control. A user may create a real-time information stream with another user by generating a metadata record and publishing it to the metadata database and then writing their information to the shared storage network 104. Another user may receive their collaboration information by requesting the metadata record from the database and through the high assurance guard. With access to the metadata record, the user may decipher the data in the storage network to receive the information.

In various embodiments, the SSN 104 may comprise a multi-level security (MLS) data transfer environment for storage area network based data transfers, internet protocol (IP) based data transfers, and/or small computer system interface (SCSI) based data transfers. In one implementation, the SSN 104 may include and utilize one or more databases to assist with secure data transfers between components of the collaboration system 100. As such, encryption in the SSN 104 may be enabled at the CPU level for protection of data stored in one or more databases. In one aspect, the encryption capability may be integrated into one or more RAID controllers and the encryption may not affect the operation of the collaboration system 100, the SSN 104, and/or the various other components thereof.

In various implementations, the SSN 104 provides a layer of protection to data by providing a secure storage area with multiple domains and separating file system metadata (e.g., inodes, indirect extents, directories) from user data. Database access within the SSN 104 may be controlled by a gateway device 150 in the security gateway 106 and a separate metadata controller 152 (e.g., a metadata server). When authorized, data may be transferred through one or more dedicated high-speed storage network connections (e.g., high speed fibre channels). In one implementation, the SSN 104 comprises high-performance metadata positioning and no head seek conflict on reads and writes of short and long data. In one aspect, data transfers may be similar in scope to a drop-box proxy.

In various implementations, the collaboration system 100 provides a common store for classified data at multiple levels of security in the open or encrypted. The collaboration system 100 lowers CPU workload of transfers via direct memory access (DMA) and is not IP and/or interrupt driven. The collaboration system 100 provides an efficient mechanism to share large data files across multiple security levels with high assurance. Data with multiple security classifications may co-exist in the same storage area without need for duplication or replication. As such, the collaboration system 100 reduces the amount of storage required in an MLS environment at an exponential rate as data grows.

In one implementation, the security gateway 106 is adapted to efficiently control access to data files by directly controlling access to associated metadata. The collaboration system 100 improves performance and enhances security. Unauthorized access is physically reduced due to the multiple layers of defense provided by dedicated fibre channels, data with no metadata mixed together, and a high assurance gateway adapted to control access to the collaboration system 100. Moreover, with the use of option to encrypt data, data at rest is protected from disclosure through theft, loss, acts of GOD, or nature, and violence or conflict where equipment of facility may be compromised. In one aspect, provided decryption keys are not compromised.

In various implementations, referring to FIG. 1, devices of the collaboration system 100 are adapted to communicate using various generally known protocols via hard-wired and/or wireless communications (e.g., IP communications and fibre communications). As such, one or more of the network servers may comprise a secure network server (SNS) having multi-level security adapted to allow selected files to be shared across multiple security domains while enforcing local security policies. SNS is adapted to filter traffic based on port numbers, data security labels, dirty words searches, specified data formats, and various other selected indicators residing in the data and metadata fields.

In one embodiment, the network servers comprise a security application (e.g., a file system security mechanism), which is adapted to allow additional database security for protection against unauthorized internal and external users of the database. In one aspect, this is intended for use at system-high only where the data and metadata are separated and made available only to the authorized users without creating concurrent sessions between the internal and external components.

The network servers and the file servers may comprise various types of servers that utilize any type of modern operating systems, such as Microsoft Windows or Unix operating systems. The file servers may be referred to as database servers and may comprise any type of data source, such as a file system, a common executive, a custom application and/or memory that runs on any type of device or processing device capable of running such applications. The network servers and/or the file servers are capable of transmitting and receiving a wide variety of data including metadata, which includes information regarding other data (e.g., actual data) that is transmitted and received by the servers.

The network and file servers may include processing components and may be in communication with other processing servers in the system. The other processing servers may comprise any type of server that utilizes any modern operating system. The processing servers may perform any type of processing associated with data received via the network and file serves. In various implementations, one or more the client devices may transmit a request to the network servers, the network servers may transmit the request to the file servers, and the file servers may process the request.

The file servers may comprise any type of storage device, such as disks, tapes and/or memory. In one implementation, the file servers may comprise a Redundant Array of Independent Disk (RAID) that provide data availability and performance by combining multiple storage disks under common management. The file servers may be adapted to store large amounts of data in a plurality of RAIDs associated with a switch or hub. The file servers may be integrated as part of the SSN 104, which comprises an infrastructure utilizing Fibre Channel (FC) technology that allows multiple servers to efficiently connect to shared storage devices, such as RAIDs. Although SANs may be implemented in Internet Protocol (IP) networks, they may also be implemented in other networks, such as Small Computer Storage Interface (SCSI) networks to provide increased security.

The network and file servers may communicate with one or more client devices via the SSN 104. In various implementations, the SSN 104 may be implemented as a single network or a combination of multiple networks. For example, SSN 104 may include the Internet and/or one or more intranets, landline networks, wireless networks, and/or other appropriate types of communication networks. In another example, the SSN 104 may comprise a wireless telecommunications network (e.g., cellular phone network) adapted to communicate with other communication networks, such as the Internet.

The client devices, in various embodiments, may be implemented using any appropriate combination of hardware and/or software configured for wired and/or wireless communication over the SSN 104. For example, the client devices may be implemented as a personal computer of a user (e.g., a client) in communication with the SSN 104. In other examples, the client devices may be implemented as a wireless telephone (e.g., cell phone), personal digital assistant (PDA), notebook computer, and/or various other generally known types of wired and/or wireless computing devices. In one aspect, the client devices may be referred to as a user device without departing from the scope of the present disclosure.

The client devices, in various embodiments, may comprise any type of computing device or configuration operating on any type of computer platform and capable of supporting a user interface. The user interface may include a browser, such as network browser or any other interface capable of appropriately displaying data, soliciting user input, and communicating with the SSN 104. The client devices may be adapted to communicate with the network and file servers via the SSN 104.

In one implementation, at least one security device (e.g., firewall security device) may be located between the network and file servers and the client devices. The security device may comprise a computing device or a group of computing devices that implement filtering, monitoring and logging of sessions between the client devices and the network and file servers. The security device may be implemented in applications that reside on the network and file servers, or in separate hardware units, such as routers. If the security device is located in the communication path between the client devices and the network and file servers, the information transmitted between the client devices and the network and file servers may pass through the firewall of the security device. The security device, thus, adds a layer of security on the side of the network and file servers that communicates with the SSN 104 to block particular client devices from accessing the network and file servers.

Figure 2:
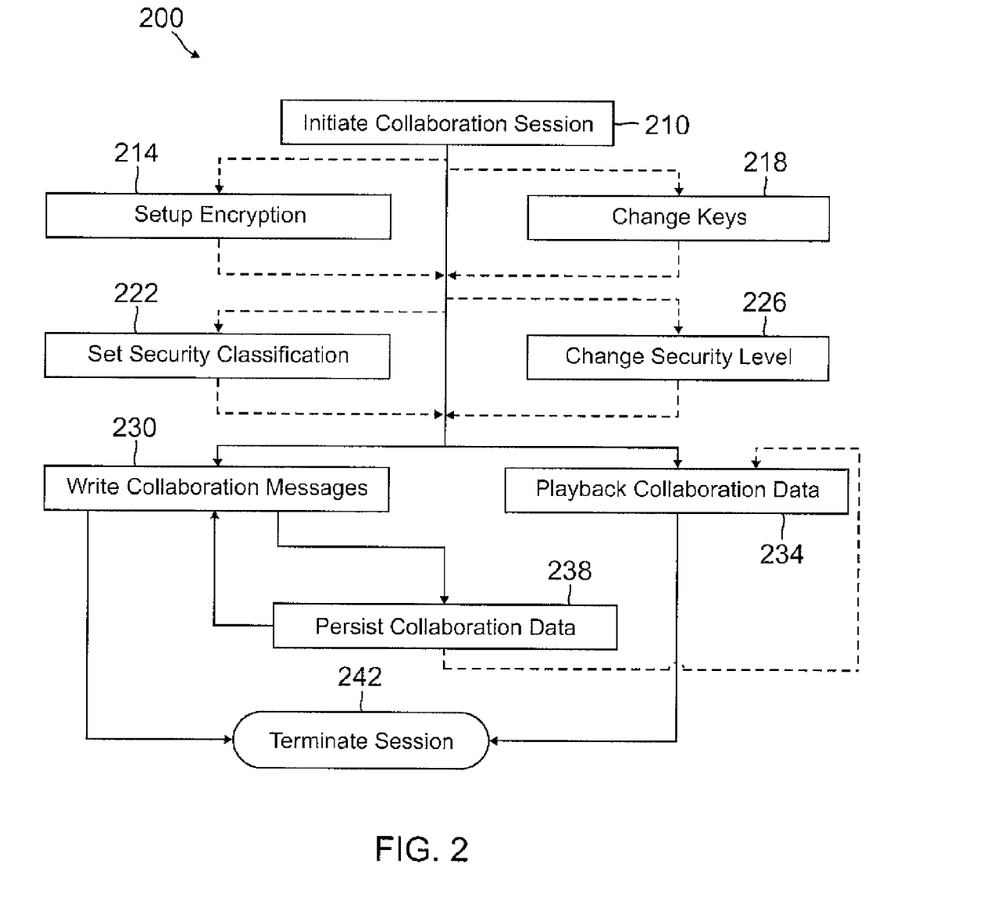
FIGS. 2-10 show various embodiments of methods for collaboration over a shared storage network, in accordance with an embodiment of the present disclosure.

FIG. 2 shows one embodiment of a method 200 for collaboration over a shared storage network 100 with reference to FIG. 1. In one aspect, a collaboration message may be defined as a transmission of data in a collaboration session, wherein collaboration messages may be written to and stored in a designated shared storage location and may be available for review and/or replay. Playback may be defined as a collaboration message that is retrieved from a designated shared storage location. A user may comprise one or more participants (e.g., a system or human actor), and one or more users may join a collaboration session in real-time or anytime after a session has begun. In another aspect, it should be appreciated that solid lines connecting blocks in FIG. 2 may refer to necessary operations, and dashed lines connecting blocks in FIG. 2 may refer to optional operations.

Referring to FIG. 2, a collaboration session is initiated (block 210). In one aspect, this refers to sharing data between one or more users in at least one of a real time, delayed, and/or broadcast manner.

Next, optionally, encryption for the collaboration session may be set up (block 214). In one aspect, this may refer to encrypting data while at rest.

In one implementation, optionally, encryption keys for the collaboration session may be changed (block 218). In one aspect, this may refer to the manner in which encryption and/or decryption keys are shared and/or changed.

In another implementation, optionally, a security classification for the collaboration session may be set (block 222). In one aspect, this may refer to the security level that shared data may set, e.g., unclassified, secret, top secret, etc.

In still another implementation, optionally, a security level for the collaboration session may be changed (block 226). In one aspect, this may refer to changing data that may be used during a collaboration setting.

Next, collaboration messages for the collaboration session may be written (block 230). In one aspect, this may refer to writing data that may be shared during a collaboration setting.

In one implementation, playback for collaboration data of the collaboration session may be selected (block 234). In one aspect, this may refer to sharing data that has previously been written and/or stored.

In another implementation, after writing collaboration messages, collaboration data may be selected to persist for the collaboration session (block 238). In one aspect, this may refer to retaining shared data that has been written.

Next, after writing collaboration messages and/or playback of collaboration data, the collaboration session may be terminated (block 242).

Figure 3:
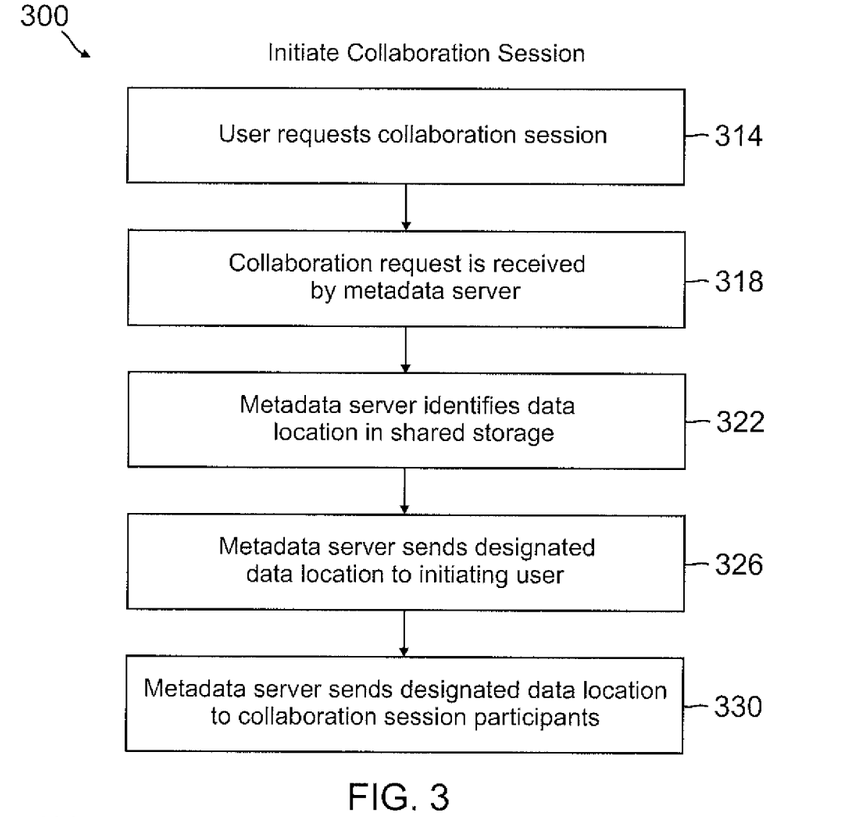

FIG. 3 shows one embodiment of a method 300 for initiating a collaboration session over a shared storage network 100 with reference to FIGS. 1 and 2. In one aspect, the method 300 of FIG. 3 describes one implementation of block 210 of FIG. 2.

Referring to FIG. 3, a user (e.g., user 130 of FIG. 1) requests a collaboration session (block 314). In one aspect, this may refer to setting up a collaboration session for the user.

Next, the requested collaboration session is received by the metadata server 150 of FIG. 1 (block 318). In one aspect, this may refer to reserving storage area requested by the user.

Next, the metadata server 150 identifies a data location in the shared storage network 104 (block 322). In one aspect, this may refer to creating a location for the collaboration session requested by the user.

Next, the metadata server 150 sends a designated data location of the identified data to the initiating user 130 (block 326). In one aspect, this may refer to providing the location for the collaboration session to the providing user.

Next, the metadata server 152 sends the designated data allocation of the identified data to one or more collaboration session participants (e.g., user 132) (block 330). In one aspect, this may refer to providing the location for the collaboration session to client users.

Figure 4:
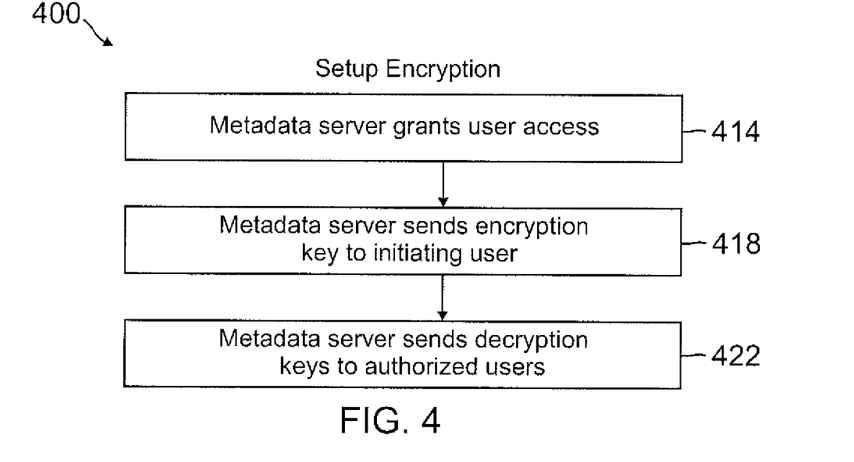

FIG. 4 shows one embodiment of a method 400 for setting up encryption for a collaboration session over a shared storage network 100 with reference to FIGS. 1 and 2. In one aspect, the method 400 of FIG. 4 describes one implementation of block 214 of FIG. 2.

Referring to FIG. 4, the metadata server 152 grants access to one or more users (e.g., users 130, 132 of FIG. 1) (block 414).

Next, the metadata server 152 sends an encryption key to an initiating user (e.g., user 130 of FIG. 1) (block 418).

Next, the metadata server 152 sends one or more decryption keys to one or more authorized users (e.g., users 132 of FIG. 1) (block 422).

Figure 5:
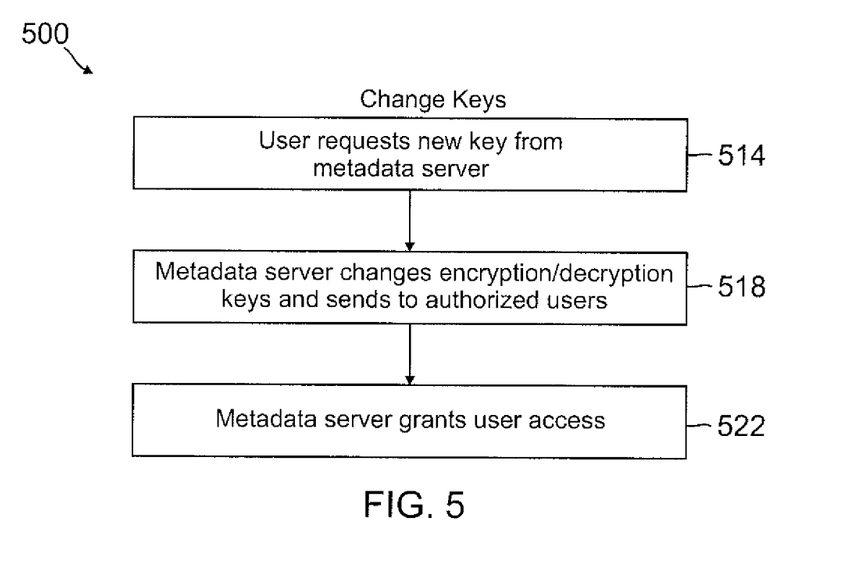

FIG. 5 shows one embodiment of a method 500 for changing encryption keys for a collaboration session over a shared storage network 100 with reference to FIGS. 1 and 2. In one aspect, the method 500 of FIG. 5 describes one implementation of block 218 of FIG. 2.

Referring to FIG. 5, a user (e.g., users 130 of FIG. 1) requests a new encryption key from the metadata server 152 (block 514).

Next, the metadata server 152 changes one or more encryption keys and sends the one or more changed encryption keys to one or more authorized users (e.g., users 130, 132 of FIG. 1) (block 518).

Next, the metadata server 152 grants access to one or more users (e.g., users 130, 132 of FIG. 1) (block 522).

Figure 6:
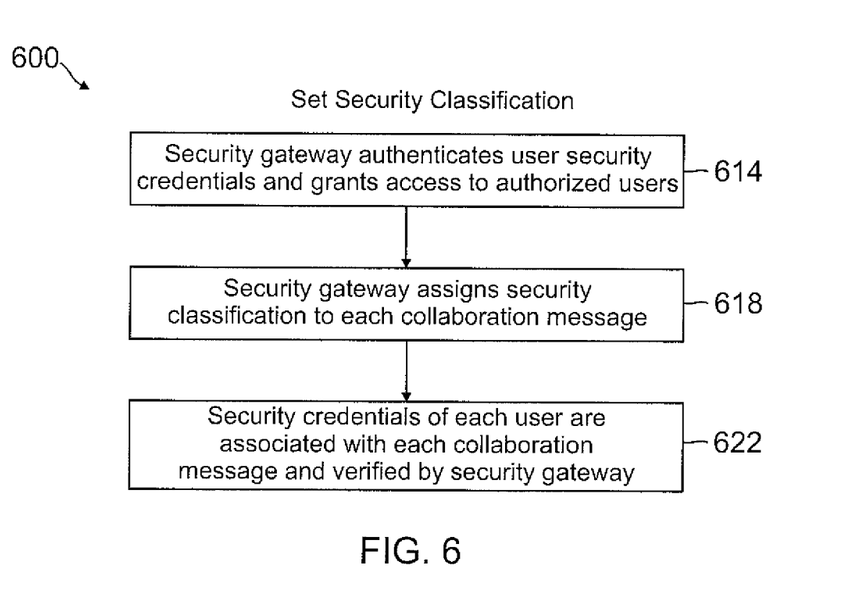

FIG. 6 shows one embodiment of a method 600 for setting security classification for a collaboration session over a shared storage network 100 with reference to FIGS. 1 and 2. In one aspect, the method 600 of FIG. 6 describes one implementation of block 222 of FIG. 2.

Referring to FIG. 6, the security gateway 150 authenticates user security credentials and grants access to one or more authorized users (e.g., users 130, 132 of FIG. 1) (block 614).

Next, security gateway 150 assigns a security classification to each collaboration message (block 618).

Next, security credentials of each user (e.g., users 130, 132 of FIG. 1) are associated with each collaboration message and verified by the security gateway 150 (block 622).

Figure 7:
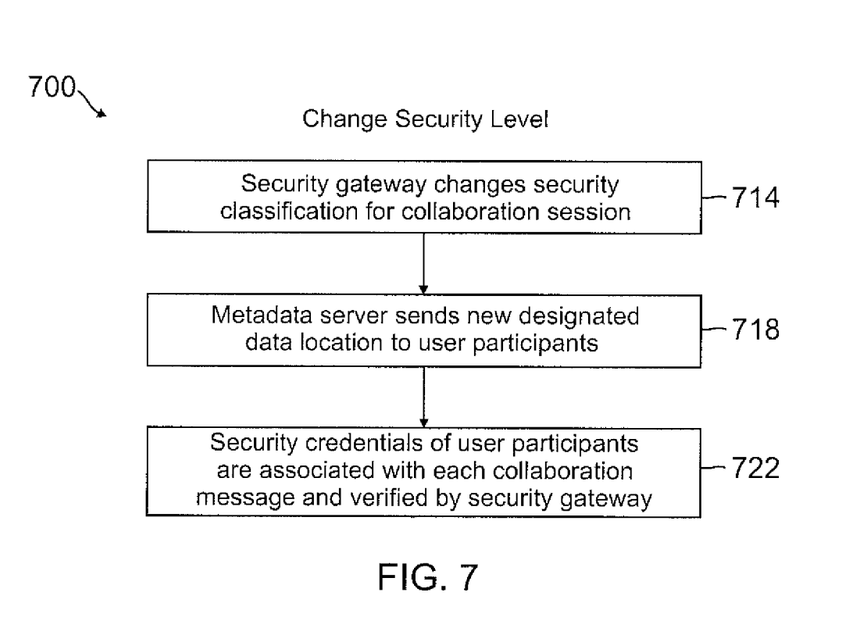

FIG. 7 shows one embodiment of a method 700 for changing a security level for a collaboration session over a shared storage network 100 with reference to FIGS. 1 and 2. In one aspect, the method 700 of FIG. 7 describes one implementation of block 226 of FIG. 2.

Referring to FIG. 7, the security gateway 150 changes a security classification for a collaboration session (block 714).

Next, the metadata server 152 sends a new designated data location to one or more user participants (e.g., users 130, 132 of FIG. 1) (block 718).

Next, security credentials of the one or more participants (e.g., users 130, 132 of FIG. 1) are associated with each collaboration message and verified by the security gateway 150 (block 722).

Figure 8:
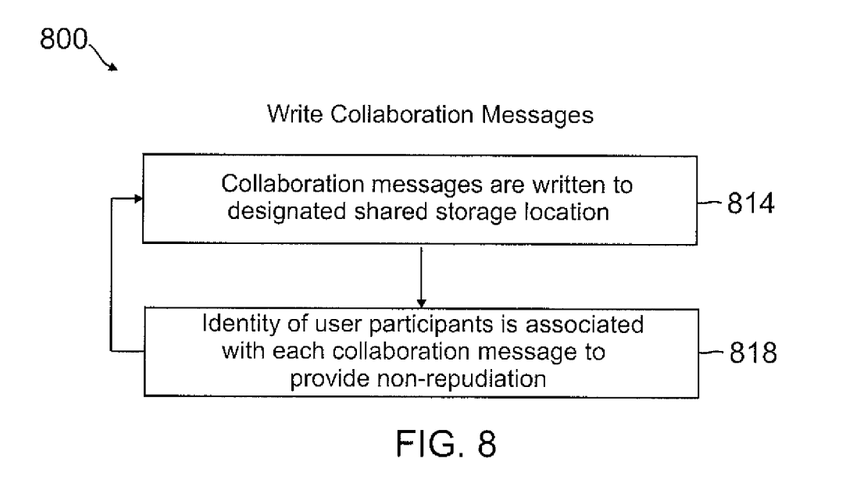

FIG. 8 shows one embodiment of a method 800 for writing one or more collaboration messages for a collaboration session over a shared storage network 100 with reference to FIGS. 1 and 2. In one aspect, the method 800 of FIG. 8 describes one implementation of block 230 of FIG. 2.

Referring to FIG. 8, a collaboration message is written to a designated shared storage location in the SSN 104 (block 814).

Next, an identity of one of more participants (e.g., users 130, 132 of FIG. 1) is associated with each collaboration message to provide non-repudiation (block 818).

Figure 9:
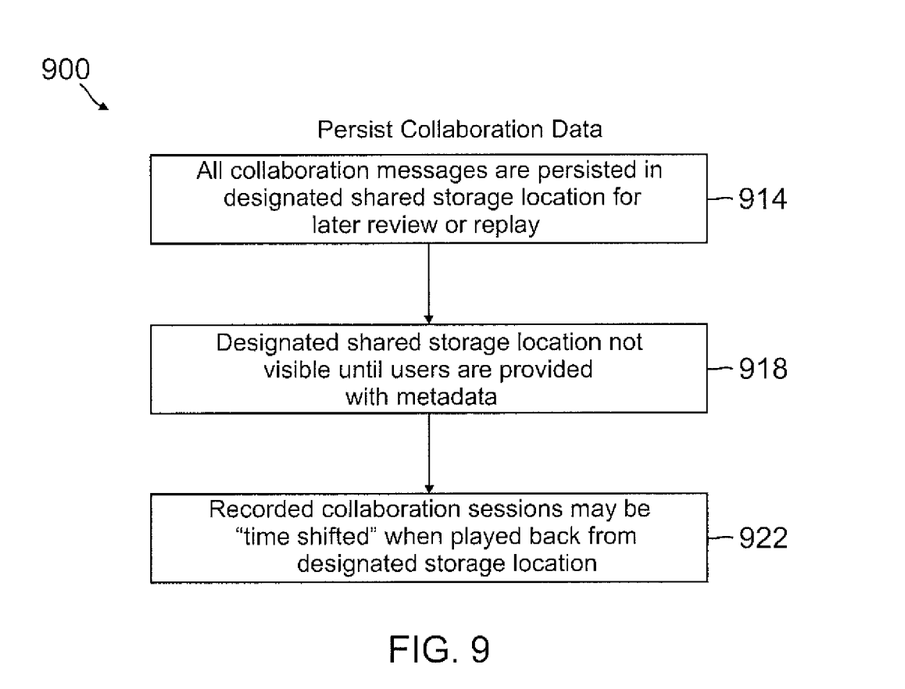

FIG. 9 shows one embodiment of a method 900 for persisting collaboration data for a collaboration session over a shared storage network 100 with reference to FIGS. 1 and 2. In one aspect, the method 900 of FIG. 9 describes one implementation of block 238 of FIG. 2.

Referring to FIG. 9, one or more collaboration messages are persisted in a designated shared storage location in the SSN 104 for review and/or replay (block 914).

Next, the designated shared storage location in the SSN 104 may be identified as non-visible until at least one user (e.g., users 130, 132 of FIG. 1) is provided with metadata (block 918).

Next, one or more recorded collaboration sessions may be time shifted when played back from the designated shared storage location in the SSN 104 (block 922).

Figure 10:
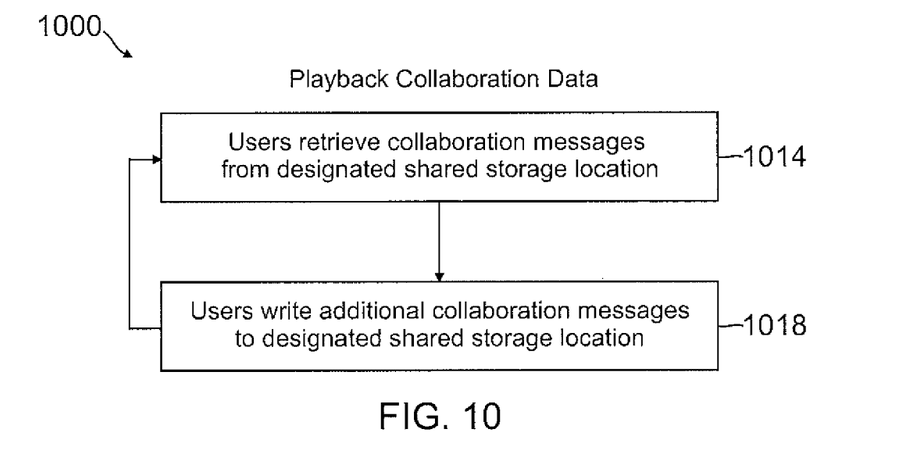

FIG. 10 shows one embodiment of a method 1000 for playing back collaboration data for a collaboration session over a shared storage network 100 with reference to FIGS. 1 and 2. In one aspect, the method 1000 of FIG. 10 describes one implementation of block 234 of FIG. 2.

Referring to FIG. 10, one or more users (e.g., users 130, 132 of FIG. 1) retrieve one or more collaboration messages from a designated shared storage location in the SSN 104 (block 1014).

Next, one or more users (e.g., users 130, 132 of FIG. 1) write additional collaboration messages to the designated shared storage location in the SSN 104 (block 1018).

Figure 11:
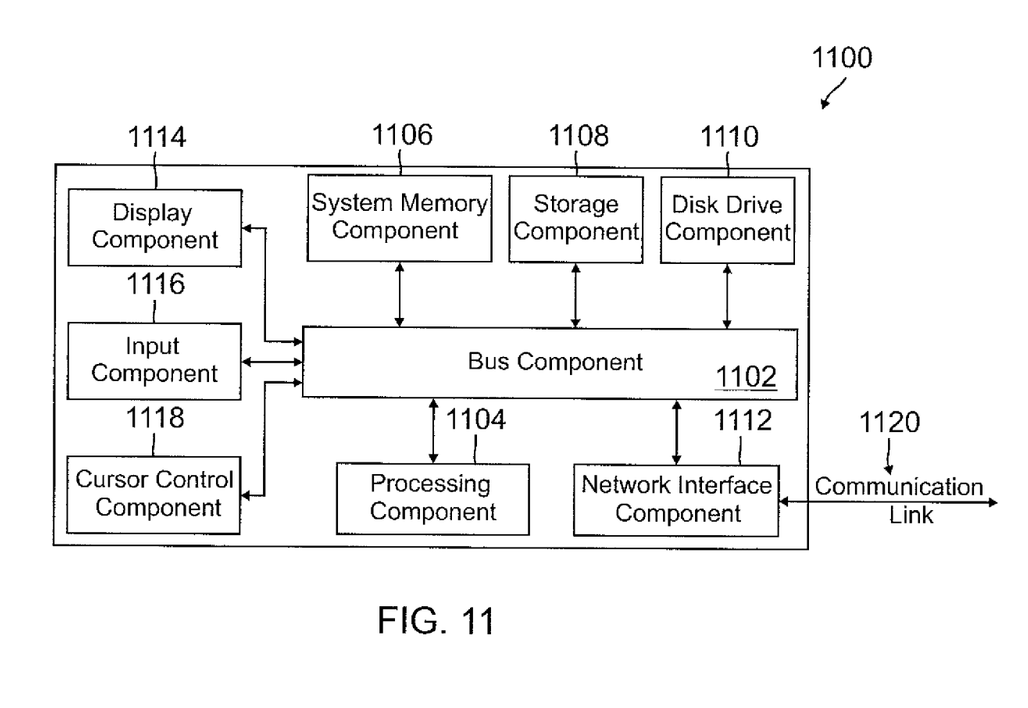
FIG. 11 is a block diagram of a computer related system suitable for implementing one or more embodiments of the present disclosure.

FIG. 11 is a block diagram of a computer system and/or controller 1100 suitable for implementing one or more embodiments of the present disclosure. Computer system 1100 includes a bus 1102 or other communication mechanism for communicating information, which interconnects subsystems and components, such as processor 1104, system memory component 1106 (e.g., RAM), static storage component 1108 (e.g., ROM), removable memory component 1110 (e.g., removable ROM memory, such as EEPROM, smart card, flash memory, etc.), wired or wireless communication interface 1112 (e.g., transceiver, modem or Ethernet card), display component 1114 (e.g., LCD, CRT, etc.), input component 1116 (e.g., sensors, such as optical sensors including stereoscopic cameras, keyboard, microphone, touch screen on display), and cursor control component 1118 (e.g., mouse button).

In accordance with embodiments of the present disclosure, computer system 1100 performs specific operations by processor 1104 executing one or more sequences of one or more instructions included in system memory component 1106. Such instructions may be read into system memory component 1106 from another computer readable medium, such as static storage component 1108 or removable memory component 1110. In other embodiments, hard-wired circuitry may be used in place of or in combination with software instructions to implement the present disclosure.

Logic may be encoded in a computer readable medium, which may refer to any medium that participates in providing instructions to processor 1104 for execution. Such a medium may take many forms, including but not limited to, non-volatile media, volatile media, and transmission media. In various implementations, non-volatile media includes removable storage media, such as removable memory component 1110, volatile media includes dynamic memory, such as system memory component 1106, and transmission media including wireless transceivers. In one example, transmission media may take the form of radio waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 1100. In various other embodiments of the present disclosure, a plurality of computer systems 1100 coupled by communication link 1120 (e.g., wireless cell phone network, wireless or wired LAN, PTSN, or various other wireless networks) may perform instruction sequences to practice the present disclosure in coordination with one another.

Computer system 1100 may transmit and receive messages, data, information and instructions, including one or more programs (i.e., application code) through communication link 1120 and communication interface 1112. Received program code may be executed by processor 1104 as received and/or stored in removable memory component 1110 or some other non-volatile storage component for execution.

Where applicable, various embodiments of the present disclosure may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into subcomponents having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:

1. A method for real-time collaboration among a plurality of users over one or more networks in a shared storage system, the method comprising:
   sending, by a metadata server to the plurality of users, a designated data location in the shared storage system for storing collaboration data for a collaboration session;
   writing, to the designated data location in the shared storage system, to store the collaboration data from at least one of the plurality of users;
   creating a metadata record with instructions for reassembling the collaboration data, wherein the writing to store the collaboration data includes disassembling the collaboration data,
   storing the metadata record in a metadata database, wherein the metadata record is needed to reassemble the collaboration data;
   reading from the designated data location to retrieve the collaboration data for viewing by one or more of the plurality of users;
   providing the metadata record to at least one user of the plurality of users for reassembling the collaboration data; and
   identifying the designated data location as non-visible until at least one user of the plurality of users is provided with the metadata record for re-assembling the collaboration data.

2. The method of claim 1, further comprising:
   performing the writing and reading in real-time during the collaboration session; and
   providing an ability for at least two of the plurality of users to simultaneously view and revise the collaboration data stored at the designated data location in the shared storage system.

3. The method of claim 1, further comprising:
   creating a real-time information stream in the shared storage system between a first user and a second user of the plurality of users.

4. The method of claim 1, wherein the designated data location in the shared storage system is visible only to those users of the plurality of users who are participants in the collaboration session.

5. The method of claim 1, further comprising:
   reserving a storage area in the shared storage system for a collaboration session, wherein the designated data location for storing the collaboration data for the collaboration session includes the storage area.

6. The method of claim 1, wherein the collaboration data in the collaboration session is protected by encryption.

7. The method of claim 1, wherein a security classification is associated with the collaboration data in the collaboration session.

8. A shared storage system for real-time collaboration among a plurality of users over one or more networks, the shared storage system comprising:
   a storage device having a designated data location;
   a metadata server configured to send, to the plurality of users, the designated data location in the shared storage system for storing collaboration data for a collaboration session;
   a metadata database;
   a metadata record with instructions for reassembling the collaboration data, wherein:
      the collaboration data is disassembled when stored in the designated data location;
      the metadata record is stored in the metadata database;
      the metadata record is needed to reassemble the collaboration data; and
      the metadata record enables at least one user of the plurality of users to reassemble the collaboration data; and
   one or more processors configured to write to the designated data location in the shared storage system to store the collaboration data from at least one of the plurality of users or to read from the designated data location to retrieve the collaboration data for viewing by one or more of the plurality of users; wherein:
   the designated data location is identified as non-visible until at least one user of the plurality of users is provided with the metadata record for re-assembling the collaboration data.

9. The system of claim 8, wherein:
   the one or more processors are configured to write to or read from the designated data location in real-time during the collaboration session to enable at least two of the plurality of users to simultaneously view and revise the collaboration data stored at the designated data location in the shared storage system.

10. The system of claim 8, further comprising:
a metadata record generated in real-time and stored in the metadata database so that a request for the metadata record enables creation of a real-time information stream in the shared storage system between a first user and a second user of the plurality of users.

11. The system of claim 8, wherein:
the designated data location in the shared storage system is identified as visible only to those users of the plurality of users who are participants in the collaboration session.

12. The system of claim 8, wherein:
the collaboration data in the collaboration session is protected by encryption, and wherein participation in the collaboration session is restricted by controlling access to at least one of an encryption key and a decryption key.

13. The system of claim 8, wherein:
multiple encryption keys and decryption keys are used to encrypt and decrypt, respectively, the collaboration data in the collaboration session;
access to the encryption and decryption keys is provided to one or more participants in the collaboration session; and
access to the encryption and decryption keys restricts the collaboration data each participant views or contributes.

14. A computer program product comprising a non-transitory computer readable medium having computer readable and executable code for instructing one or more processors to perform a method for facilitating real-time collaboration among a plurality of users over one or more networks in a shared storage system, the method comprising:
sending, by a metadata server to the plurality of users, a designated data location in the shared storage system for storing collaboration data for a collaboration session;
writing, to the designated data location in the shared storage system, to store the collaboration data from at least one of the plurality of users;
creating a metadata record with instructions for reassembling the collaboration data, wherein the writing to store the collaboration data includes disassembling the collaboration data,
storing the metadata record in a metadata database, wherein the metadata record is needed to reassemble the collaboration data;
reading, from the designated data location, to retrieve the collaboration data for viewing by one or more of the plurality of users;
providing the metadata record to at least one user of the plurality of users for reassembling the collaboration data; and
identifying the designated data location as non-visible until at least one user of the plurality of users is provided with the metadata record for re-assembling the collaboration data.

15. The computer program product of claim 14, wherein the method further comprises:
performing the writing and reading in real-time during the collaboration session; and
providing an ability for at least two of the plurality of users to simultaneously view and revise the collaboration data stored at the designated data location in the shared storage system.

16. The computer program product of claim 14, wherein the method further comprises:
creating a real-time information stream in the shared storage system between a first user and a second user of the plurality of users.

17. The computer program product of claim 14, wherein the collaboration data in the collaboration session is protected by encryption, and wherein participation in the collaboration session is restricted by controlling access to at least one of an encryption key and a decryption key.

18. The computer program product of claim 14, wherein a security classification is associated with the collaboration data.

19. The computer program product of claim 14, wherein the designated data location in the shared storage system is visible only to those users of the plurality of users who are participants in the collaboration session.

20. The computer program product of claim 14, wherein the method further comprises:
reserving a storage area in the shared storage system for a collaboration session, wherein the designated data location for storing the collaboration data for the collaboration session includes the storage area.

* * * * *